United States Patent Office 2,714,553
Patented Aug. 2, 1955

2,714,553

FERTILIZER AND METHOD OF MAKING SAME

Carlisle H. Bibb and Reid H. Leonard, Pensacola, Fla., assignors to Newport Industries, Inc., Pensacola, Fla., a corporation of Delaware No Drawing. Application February 15, 1951, Serial No. 211,184

3 Claims. (Cl. 71—23)

The present invention relates to an improved fertilizer composition, and to a method of manufacturing the same.

The fertilizer compositions of the present invention are characterized by a high nitrogen availability, and by the fact that the rate of nitrogen availability of the fertilizer can be varied depending upon the method used for its production.

An object of the present invention is to provide a method for manufacturing a fertilizer having a high nitrogen content.

Another object of the present invention is to provide a fertilizer composition having a low apparent density, making it easy to spread.

Another object of the present invention is to provide a fertilizer composition in which the rate of nitrogen availability is controllable.

Still another object of the present invention is to provide a method for making a fertilizer which uses waste products from wood processing.

The fertilizer of the present invention may be described as a hydrolyzed wood product containing substantial amounts of lignin material, the hydrolyzed wood product containing a urea-formaldehyde partial condensation product molecularly dispersed in and partly chemically combined with the hydrolyzed wood. Both the hydrolyzed wood product and the urea-formaldehyde resin contribute fertilizing properties to the soil. The hydrolyzed wood portion of the fertilizer has been found to contribute humus to the soil. The urea-formaldehyde condensation product furnishes a source of nitrogen due to its gradual decomposition.

In general, the process of the present invention consists in hydrolyzing wood with an acid solution and treating the hydrolyzed wood so as to produce a urea-formaldehyde condensation product in situ in the wood. In this form, the urea-formaldehyde condensation product has been found to yield a very effective source of nitrogen. The urea-formaldehyde resins produced according to the process of the present invention are of relatively low molecular weight, so that the nitrogen therein becomes slowly available to plants when applied to the soil. This is in distinction to ordinary urea-formaldehyde condensation products of the type normally produced for commercial resins and plastics which are useless for fertilization purposes because of their extreme insolubility and inertness in soil.

The nitrogen compounds present in the reaction product can be segregated into three fractions, namely, (1) a fraction soluble in a single cold water extraction, per the procedure suggested by the Association of Official Agricultural Chemists (A. O. A. C.); (2) a fraction soluble in boiling water; and (3) a fraction insoluble in boiling water. Examples of nitrogen distribution among various samples follows:

| Sample | Approximate Percent N | A.O.A.C. Soluble (Percent) | Boiling Water Soluble (Percent) | Residue (Percent) |
|---|---|---|---|---|
| A | 20 | 29 | 35 | 36 |
| B | 20 | 30 | 39 | 31 |
| C | 20 | 25 | 29 | 46 |
| D | 10 | 10 | 13 | 77 |
| E | 10 | 10 | 13 | 77 |

In the above tests, the boiling water soluble nitrogen was obtained by using the wet residue from the A. O. A. C. extraction with water. The residue was dropped into 250 ml. of vigorously boiling water, boiled exactly 5 minutes and filtered on a Buchner funnel. A nitrogen determination on the filtrate gave the hot water soluble fraction, and the residue gives the insoluble nitrogen.

That the urea-formaldehyde condensation products produced in accordance with the present invention are of relatively low molecular weight is confirmed by the fact that a substantial portion of the condensation products may be dissolved in hot water. A methylol urea polymer extracted from the condensation product by means of boiling water had a molecular size corresponding to four moles of urea and three moles of formaldehyde. The products of the present invention are characterized by the fact that from about 10% to about 40% of the nitrogen material present is soluble in boiling water.

The nature of the reaction between the lignin-containing wood hydrolysis products and the urea-formaldehyde resin is quite complex. The lignin appears to react with the methylol urea derivatives to produce a lignin-methylol urea complex. It also appears that some of the urea combines with the hydrolyzed wood products rather than with the formaldehyde to produce slow leaching nitrogen compounds, such as amino and imino derivatives, which themselves have fertilizer value. Thus, relatively smaller amounts of formaldehyde may be used, since the hydrolyzed wood itself reacts with urea to produce nitrogen-yielding compounds.

The following reactions are believed typical of those occurring between the lignocellulose material with urea and formaldehyde:

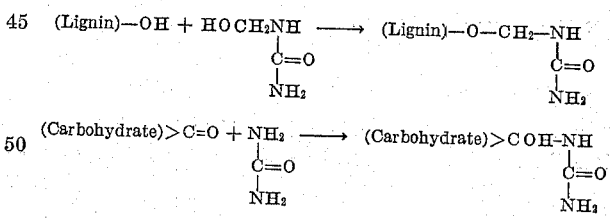

Hydrolyzed wood has been found to be a particularly desirable carrier material for the urea-formaldehyde condensation product because, during acid hydrolysis of the wood, organic aldehydes and acids are produced. These materials act as acceptors for ammonia gas which may be generated by the decomposition of urea. In view of the above, the combination fertilizer produced by intimately dispersing a urea-formaldehyde condensation product within an acid-hydrolyzed wood has been found to produce a particularly useful fertilizing material.

The hydrolysis of the wood may be carried out in several different manners for the purposes of this invention. A typical hydrolysis procedure involves soaking wood chips in a 3% sulfuric acid solution until the chips are thoroughly impregnated with the acid. After drainage of surplus acid, the chips are placed in an autoclave into which steam is rapidly admitted until the pressure reaches about 270 pounds per square inch. The acid-impregnated chips are cooked in the autoclave from one to three minutes and then the entire contents of the autoclave are blown into a receiver. As the material enters the receiver, the excess steam escapes, leaving a soft, wet mass of hydrolyzed wood containing about 25% of the original weight of the wood as sugars. This material is then treated to remove the solubles present, as by washing with water and filtering, leaving a form of hydrolyzed wood containing a fairly high percentage of lignin. Washing of the hydrolyzed product with water to remove water soluble materials such as sugars is carried out to leave an acid pH in the filter cake, of a value from about 2.0 to 6.0 to catalyze the subsequent condensation reaction.

In addition to sulfuric acid mentioned above, other inorganic acids such as nitric, phosphoric, hydrochloric, and sulfuric acids may be used, although sulfuric acid appears to be the most economical.

The yield of lignin residue is variable, depending upon the type of wood used and the acid concentration employed in the hydrolysis process. The following table shows the effect of varying the hydrolysis time, when using a 1.5% sulfuric acid solution for hydrolysis and a steam pressure of 275 pounds per square inch in the autoclave:

TABLE I

*Hydrolysis for lignin residue*

| No. | Period, Min. | Dry Substance in Hydrolysate, Percent D.W.S. | Dry Substance in Filter Cake, Percent Cake | Insoluble Residue, Percent D.W.S. | Soluble Material, Percent D.W.S. | Total Sugar, Percent D.W.S. | Sugar Purity, Percent Solubles |
|---|---|---|---|---|---|---|---|
| 1 | 3 | 46.6 | | 70.1 | 29.9 | 19.8 | 66 |
| 2 | 4 | 44.9 | 44.4 | 77.7 | 22.3 | 16.8 | 75 |
| 3 | 2 | 45.1 | 36.3 | 77.4 | 22.6 | 17.5 | 77 |
| 4 | 1.5 | 42.8 | 39.8 | 80.1 | 19.9 | 19.3 | 97 |
| 5 | 2.5 | 42.9 | 37.6 | 73.6 | 26.4 | 20.7 | 78 |
| 6 | 3.5 | 40.7 | 39.7 | 77.4 | 22.6 | 18.8 | 83 |
| 7 | 3.0 | 42.9 | 39.4 | 73.1 | 26.9 | 19.7 | 73 |
| 8 | 1.0 | 49.0 | 40.6 | 81.6 | 18.4 | 15.8 | 86 |
| 9 | 2.5 | 43.4 | 35.2 | 72.4 | 27.6 | 21.6 | 78 |

D. W. S. = dry wood substance.

Even when subjected to a mild acid hydrolysis, wood loses its strength rapidly, and when blown from the autoclave disintegrates into a fine condition. The hydrolysis makes the material much easier to grind into a fine dust. In addition, organic acids and aldehydes are produced within the structure of the wood and these compounds act as acceptors for ammonia gas generated by the nitrogenous material.

As shown in Table I, the residue contains substantial amounts of sugars. It may be desirable in some instances to remove all or part of the sugar present, as the presence of sugars tends to make the fertilizer hygroscopic on storage. On the other hand, the presence of sugars in the fertilizer gives rise to a reaction between the sugars, urea, and formaldehyde to yield nitrogen-liberating compounds.

Relatively high concentrations of sulfuric acid can also be employed within the practice of the present invention. However, too rapid hydrolysis of the wood is to be avoided. Control of the extent of hydrolysis can conveniently be accomplished by using lower concentrations of acids and lower temperatures in the hydrolysis step.

The following table illustrates results obtained when using 10% and 15% sulfuric acid solutions and temperatures of 160° C.:

TABLE II

| Conc. Acid, Percent | Period, Min. | Insoluble Residue, Percent D.W.S. | Solubles, Percent D.W.S. | Reducing Sugar, Percent D.W.S. | Organic Acid* |
|---|---|---|---|---|---|
| 10 | 2 | 80.3 | 19.7 | 15.3 | 1.8 |
| 10 | 6 | 67.1 | 32.9 | 15.9 | 3.7 |
| 10 | 8 | 66.6 | 33.4 | 16.7 | 5.7 |
| 10 | 10 | 75.6 | 24.4 | 20.3 | 6.9 |
| 15 | 2 | 71.4 | 28.6 | 17.4 | 3.5 |
| 15 | 4 | 66.0 | 34.0 | 17.0 | 4.1 |
| 15 | 6 | 65.6 | 34.0 | 16.4 | 6.5 |
| 15 | 8 | 62.6 | 37.4 | 16.8 | 6.1 |
| 15 | 10 | 62.2 | 37.8 | 17.4 | 5.4 |
| 15 | 12 | 57.7 | 42.3 | 15.5 | 8.1 |

*Organic acid was determined by titrating with $NH_4OH$ to phenol red. Results are calculated in terms of sulfuric acid and expressed in same units as initial acid concentration.

The product of the wood hydrolysis is apparently a complex mixture of pitches, tars and cellulosic materials containing substantial amounts of lignin material. The lignin residue was classified according to particle size and extracted with methanol. The results are tabulated below:

TABLE III

| Size | Amount, Percent | Methanol Soluble, Percent |
|---|---|---|
| >40 mesh | 32.8 | 25.2 |
| 40–60 mesh | 18.3 | 30.4 |
| 60–80 mesh | 8.2 | 30.5 |
| 80–100 mesh | 15.3 | 30.7 |
| <100 mesh | 25.4 | 31.2 |

The chemical composition of the methanol soluble material is rather indefinite. In physical appearance the material varies from a brittle to a slightly plastic mass.

The lignin residue also contains some material soluble in alkaline solutions. When 200 grams of the air-dried lignin were extracted with 500 milliliters of a 2% sodium carbonate solution, a weight loss of 9.0% was observed. The alkaline extract precipitated at a pH of 1.9 to give a solid representating 2.6% by weight of the original material.

When the alkaline liquor was extracted with benzene, 0.4% of a phenolic-vanillin-like gum was obtained. The filtrate, after acidification, gave positive tests for sugars, phenols, carbonyls, and methyl carbonyl.

When 200 grams of the air-dried lignin material were extracted with 750 milliliters of 1.33% sodium hydroxide solution, by boiling the same for one hour, a 17% weight loss occurred. By precipitating with acid, 16.5% by weight of a solid was recovered, based upon the original lignin material used.

For the purpose of producing the urea-formaldehyde condensation product, the lignin-containing hydrolysis product is preferably recovered from the filters in moist condition, without drying. The water in the wet lignin cake acts as a reaction diluent for the condensation reaction between the urea and formaldehyde so that the reaction conditions can be more carefully controlled.

The nitrogen content of the product depends essentially upon the amount of urea originally introduced. The nitrogen content can be as low as 1% or as high as 36% to 38%. For overall use, it is usually desirable to produce a fertilizer having a nitrogen content of about 20%.

The urea can be added directly to the moist filter cake recovered from the acid hydrolysis to be dissolved therein. After addition of urea, formaldehyde is added to the urea-containing mixture for the purpose of reacting with urea in the formation of the low molecular weight condensation products.

The relative proportions between the urea and formaldehyde added are quite important in the control of the ultimate product. We have found that the ratio of urea to formaldehyde, on a molecular basis, should be at least 1:1, and preferably from 1:1 to 2:1. The nature of the product varies considerably with the urea-formaldehyde molecular ratio. If the urea-formaldehyde ratio and the temperature of condensation are low, polymeric condensation products are produced which have maximum utility as slow-leaching, nitrogenous fertilizers.

One of the features of the present invention resides in the fact that the rate of nitrogen availability of the fertilizer can be controlled by varying the relative proportions of urea and formaldehyde in the product. Due to differing rates of growth and other factors, each crop demands nitrogen over certain periods of time. For example, the time during which nitrogen must be available for a corn crop is relatively short, while it may be much longer for fruit trees.

Accordingly, the rate of availability of nitrogen in the fertilizer of the present invention can be controlled by varying the amount of formaldehyde added to the hydrolyzed wood. By increasing the formaldehyde added, the rate of availability is decreased, and conversely. Consequently, the product of the present invention can be altered depending upon its ultimate use.

For general purposes, a nitrogen content of about 20% is desirable. For this type of fertilizer, approximately 0.8 molecular proportions of formaldehyde are used for each molecular proportion of urea (corresponding to a weight ratio of two parts formaldehyde to five parts urea). The color of this fertilizer is a rich brown, and the product is compatible with other organic material for use in mixed fertilizers.

The effect of varying the urea-formaldehyde ratio is illustrated in the following table. Small amounts of ammonium chloride were also added in some of the runs as indicated below:

TABLE IV

*Lignin-urea-formaldehyde*

| Urea/CH₂O Ratio | NH₄Cl | Drying Method | N Analysis | | |
|---|---|---|---|---|---|
| | | | Total, Percent | Insoluble, Percent | Soluble, Percent |
| ∞ | + | Air, 4 weeks | 6.07 | 0.0 | 6.07 |
| 2.15 | + | do | 6.15 | 2.48 | 3.67 |
| 1.23 | + | do | 6.14 | 4.71 | 1.43 |
| 0.97 | + | do | 5.92 | 5.48 | 0.44 |
| ∞ | + | 3 hrs., 110° C | 6.3 | 0.7 | 5.6 |
| 2.15 | + | do | 6.3 | 2.9 | 3.4 |
| 1.23 | + | do | 6.3 | 5.2 | 1.1 |
| 0.97 | + | do | 6.3 | 5.9 | 0.4 |
| 1.25 | − | 16 hrs., 110° C | 7.60 | 6.36 | 1.24 |
| 1.25 | − | 1 hr., 110° C | 7.60 | 5.39 | 2.21 |
| 1.25 | − | 20 hrs., 110° C | 12.06 | 11.01 | 1.05 |
| 1.88 | − | do | 18.18 | 11.10 | 7.08 |
| 1.25 | − | 16 hrs., 110° C | 11.62 | 10.42 | 1.20 |
| 1.88 | − | do | 17.82 | 10.58 | 7.24 |
| 1.25 | − | 8 hrs., 110° C | 20.7 | 19.3 | 1.4 |
| 1.25 | − | do | 21.2 | 19.9 | 1.3 |
| 1.25 | − | 16 hrs., 75° C | 20.0 | 16.9 | 3.1 |

The urea-formaldehyde condensation product is produced under atmospheric pressure and at relatively low temperatures, ordinarily under 100° C. Temperatures of 30° C. to 90° C. are usually employed. The reaction proceeds smoothly, and apparently to completion, since no odor of formaldehyde could be detected in the reaction product.

The condensation product forms upon allowing the mixture to stand, and as the condensation occurs, the mass hardens until it can be broken up. The temperature rises somewhat due to the chemical reaction, but still remains considerably lower than temperatures employed in making commercial urea-formaldehyde resins.

After the reaction is completed, the mixture is dried and ground to a finished product. For direct application to the soil, the particle size of from 10 to 20 mesh is preferred to a product containing a large amount of dust.

The fertilizers produced according to the present invention are characterized by very low apparent density, and consequently a large amount of area per unit volume.

The fertilizers produced according to the present invention can be used alone or as conditioners for other fertilizer compositions. The present fertilizers are particularly adaptable for use in such mixed fertilizers because they have anti-caking properties when so used.

From the foregoing it will be appreciated that we have herein provided a novel type of fertilizer composition, including a urea-formaldehyde condensation product molecularly dispersed in, and partially combined with, a product resulting from the acid hydrolysis of wood. The new fertilizer product has a variable nitrogen content and also has an adjustable rate of nitrogen availability depending upon the method used for its production.

While the invention has been described in connection with the treatment of "wood," it will be appreciated that other types of lignocellulose-containing plant material, including cereal hulls, corn cobs, bagasse, and the like may be used in the process described.

It will be understood that modifications and variations may be effected without departing from the scope of the novel concepts of the present invention.

We claim as our invention:

1. A method which comprises subjecting wood to hydrolytic conditions of aqueous acid under pressure to obtain a moist hydrolyzed mass containing substantial amounts of lignin residue and to convert at least one-fourth of the original weight of the wood to sugars, removing water-soluble material from the mass by washing the same while retaining the organic solvent soluble ingredients, dissolving $x$ molar equivalents of urea in the moist hydrolyzed mass to react the same therewith, then reacting the urea-containing mass with (½ to 1)$x$ molar equivalents of formaldehyde, and recovering a fertilizer product comprising a urea-formaldehyde condensation product dispersed in and partially combined with said hydrolyzed material.

2. A method which comprises subjecting wood to hydrolytic conditions of aqueous acid under pressure to obtain a moist hydrolyzed mass containing substantial amounts of lignin residue that is 30% methanol-soluble and to convert at least one-fourth of the original weight of the wood to sugars, washing the mass with water to remove water-soluble material therein while retaining the organic solvent soluble ingredients and to obtain a pH of 2-6, dissolving $x$ molar equivalents of urea in the moist hydrolyzed mass in an amount sufficient to impart thereto a total nitrogen content of 20%, then reacting the urea-containing mass with (½ to 1)$x$ molar equivalents of formaldehyde, and recovering a fertilizer product comprising a urea-formaldehyde condensation product dispersed in and partially combined with said hydrolyzed material.

3. A method which comprises subjecting wood to hydrolytic conditions of aqueous acid under pressure to obtain a moist hydrolyzed mass containing substantial amounts of lignin residue and to convert at least one-fourth of the original weight of the wood to sugars, removing water-soluble material from the mass by washing the same while retaining the organic solvent soluble ingredients, dissolving $x$ molar equivalents of urea in the moist hydrolyzed mass to react the same therewith in an amount sufficient to impart thereto a total nitrogen content of about 20%, then reacting the urea-containing mass with 0.8$x$ molar equivalents of formaldehyde, and recovering a fertilizer product comprising a urea-formaldehyde condensation product dispersed in and partially combined with said hydrolyzed material.

References Cited in the file of this patent

UNITED STATES PATENTS

| Number | Name | Date |
|---|---|---|
| 1,105,607 | Benjamin | Aug. 4, 1914 |
| 1,953,832 | Sandell | Apr. 3, 1934 |
| 2,056,454 | Howald | Oct. 6, 1936 |
| 2,096,742 | Hale | Oct. 26, 1937 |
| 2,142,965 | Hale | Jan. 3, 1939 |
| 2,155,067 | Ubbelohde | Apr. 18, 1939 |
| 2,197,724 | Hovey | Apr. 16, 1940 |
| 2,362,390 | Millar | Nov. 7, 1944 |
| 2,415,705 | Rohner et al. | Feb. 11, 1947 |
| 2,501,665 | Evans et al. | Mar. 28, 1950 |
| 2,538,457 | Hudson | Jan. 16, 1951 |

FOREIGN PATENTS

| Number | Country | Date |
|---|---|---|
| 818,116 | Germany | July 8, 1949 |